(12) United States Patent
Namburi et al.

(10) Patent No.: US 12,508,923 B2
(45) Date of Patent: Dec. 30, 2025

(54) TORQUE CAPABILITY MANAGEMENT FOR PASSIVELY DAMPED HANDWHEEL ACTUATORS

(71) Applicant: Steering Solutions IP Holding Corporation, Saginaw, MI (US)

(72) Inventors: Krishna MPK Namburi, Saginaw, MI (US); Prerit Pramod, Saginaw, MI (US); Prathima Nuli, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 86 days.

(21) Appl. No.: 18/630,355

(22) Filed: Apr. 9, 2024

(65) Prior Publication Data

US 2024/0343125 A1    Oct. 17, 2024

Related U.S. Application Data

(60) Provisional application No. 63/459,358, filed on Apr. 14, 2023.

(51) Int. Cl.
*B60L 15/20* (2006.01)

(52) U.S. Cl.
CPC ..... *B60L 15/2009* (2013.01); *B60L 2240/423* (2013.01)

(58) Field of Classification Search
CPC . B60L 15/2009; B60L 2240/423; H02P 27/06
See application file for complete search history.

(56) References Cited

U.S. PATENT DOCUMENTS

| | | | |
|---|---|---|---|
| 2021/0031827 A1* | 2/2021 | Karve | B62D 5/0472 |
| 2024/0001986 A1* | 1/2024 | Das | B62D 5/006 |
| 2024/0132140 A1* | 4/2024 | Collier-Hallman | B62D 5/006 |
| 2024/0195333 A1* | 6/2024 | Skellenger | B62D 5/003 |
| 2024/0286669 A1* | 8/2024 | Chowdhury | B62D 5/005 |

* cited by examiner

*Primary Examiner* — Sizo B Vilakazi
(74) *Attorney, Agent, or Firm* — Dickinson Wright PLLC

(57) ABSTRACT

A method for controlling a motor drive with passive damping includes: shorting a set of windings of a motor to define a shorted set of windings; determining a short circuit current in the shorted set of windings; determining, based on the short circuit current in the shorted set of windings, a braking torque for the shorted set of windings; and commanding, based on an initial torque command and based on the braking torque, an inverter to apply an output voltage to an active set of windings of the motor and thereby causing an output current to be generated in the active set of windings.

20 Claims, 4 Drawing Sheets

TORQUE CAPABILITY MANAGEMENT FOR PASSIVELY DAMPED HANDWHEEL ACTUATORS

CROSS REFERENCE TO RELATED APPLICATION

The present application claims the benefit U.S. Provisional Patent Application No. 63/459,358, filed Apr. 14, 2023, which is incorporated herein by reference in its entirety.

TECHNICAL FIELD

This disclosure related to motor drives, and in particular to systems and methods for passive damping in a steer-by-wire handwheel actuator.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

SUMMARY

An aspect of the disclosed embodiments includes a method for controlling a motor drive with passive damping. The method includes: shorting a set of windings of a motor to define a shorted set of windings; determining a short circuit current in the shorted set of windings; determining, based on the short circuit current in the shorted set of windings, a braking torque for the shorted set of windings; and commanding, based on an initial torque command and based on the braking torque, an inverter to apply an output voltage to an active set of windings of the motor and thereby causing an output current to be generated in the active set of windings.

Another aspect of the disclosed embodiments includes a system for controlling a motor drive with passive damping. The system includes a processor and a memory. The memory includes instructions. The instructions, when executed by the processor, cause the processor to: determine a short circuit current in a shorted set of windings of a motor; determine, based on the short circuit current in the shorted set of windings, a braking torque for the shorted set of windings; and command, based on an initial torque command and based on the braking torque, an inverter to apply an output voltage to an active set of windings of the motor and thereby cause an output current to be generated in the active set of windings.

Another aspect of the disclosed embodiments includes a system for controlling a motor drive for a steering system of a vehicle. The system includes a motor configured to apply a torque to actuate a component of the steering system. The system also includes a controller that is configured to: determine a short circuit current in a shorted set of windings of the motor; determine, based on the short circuit current in the shorted set of windings, a braking torque for the shorted set of windings; and command, based on an initial torque command and based on the braking torque, an inverter to apply an output voltage to an active set of windings of the motor and thereby cause an output current to be generated in the active set of windings.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

Figure 1:
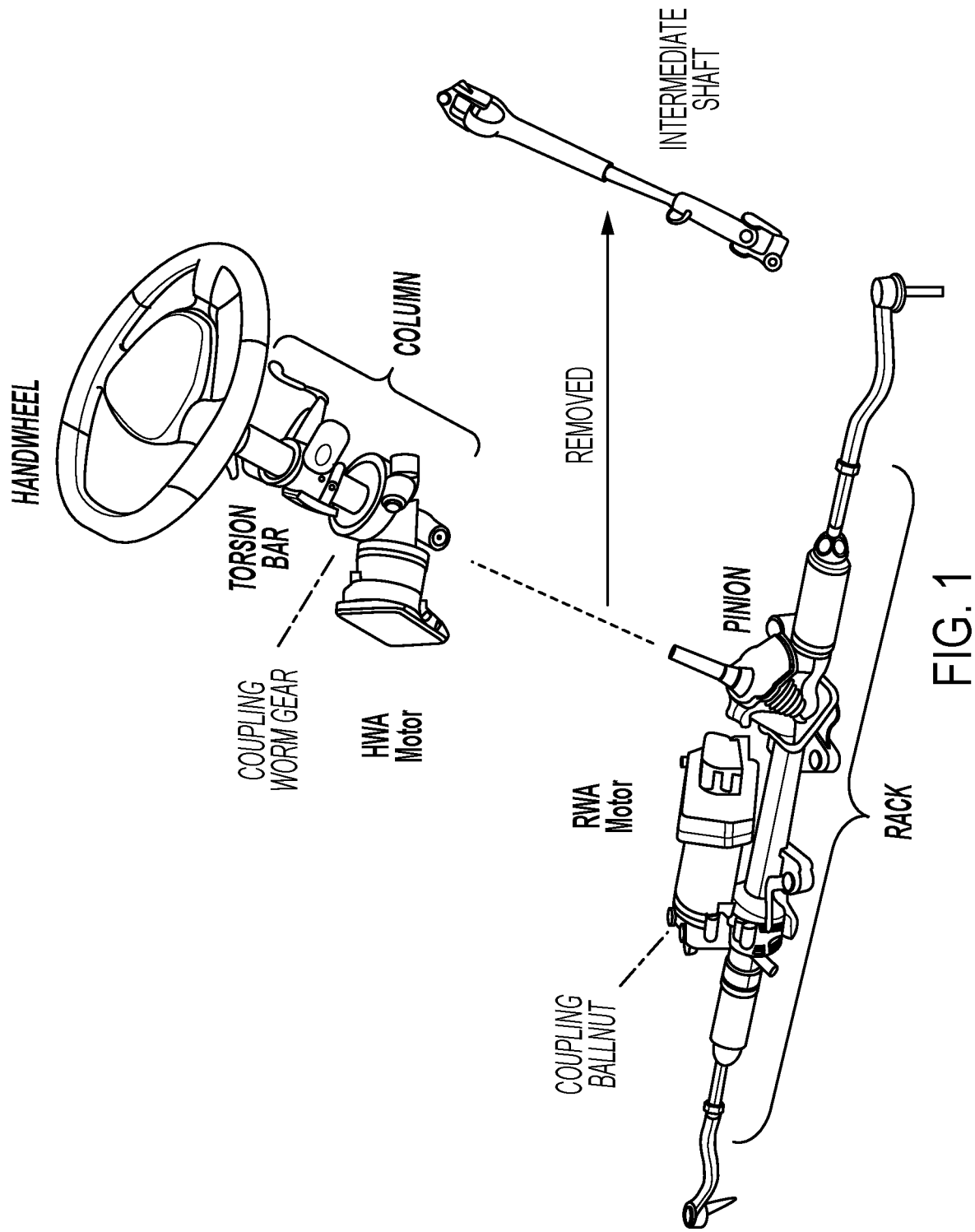
FIG. 1 generally illustrates a steering system according to the principles of the present disclosure.

Permanent magnet synchronous machines (e.g., or motors) (PMSM) are used in a variety of automotive applications ranging from steering to traction for their high torque and power densities. Electric power steering (EPS) and steer by wire (SbW) systems also see the application of PMSMs. The SbW system is an evolution of the EPS system where there is no mechanical coupling between the handwheel and the steering rack. The SbW system typically consists of two actuators: handwheel actuators (HWA) and roadwheel actuators (RWA), as is generally illustrated in FIG. 1. The SbW handwheel actuator (HWA) is typically involved in second quadrant motor operation, which may provide a feedback torque, as opposed to assist torque in an EPS system, to the driver (e.g., or operator) to ensure realistic steering feel. Because of the absence of mechanical coupling with the road wheels, the SbW system suffers from low damping under power failure and/or off condition. Absence of damping under such a condition may cause a severe safety concern. SbW HWA damping can be increased through active and/or passive means.

Due to the shorted winding in the passive damping approach, braking torque is generated and adds to the normal electromagnetic torque. Therefore, torque speed requirements may be limited during active operation of the motor drive system. The present disclosure provides for compensating for braking torque during normal active operation. Considering a 12/8 machine, the mutual inductance between the winding sets may be insignificant, however, a set of windings is shorted, that will create current in the shorted windings which could be significantly different from the active winding set, in which mutual interaction is significant.

The present disclosure addresses three main aspects of motor control with a shorted winding set. The first aspect deals with compensating the created braking torque; the second aspect deals with updating an inverse motor model used in the feedforward control which includes compensation of short circuit currents; and the third aspect deals with including the mutual inductance effects that are significant due to the shorted winding set.

The system and method of the present disclosure provides for a braking torque compensation module. The present disclosure provides a system 300 for controlling an actuator with passive damping. The system 300 may include the braking torque compensation module. For example, the braking torque compensation module may be provided by one or more components of the system 300. The braking torque compensation module may estimate the braking torque to be compensated utilizing the enhanced dual wound machine model which includes interwinding coupling. The braking torque compensation module may determine motor parameters of the shorted winding set, which may be dependent on the number of parallel paths of the motor. The braking torque compensation module may also determine short circuit currents based on interwinding coupling and active currents.

The system and method of the present disclosure also provides feedforward control of a passively damped machine, which compensates the effects of short circuit currents and interwinding coupling. The system and method of the present disclosure also provides an effective torque expression to determine current commands for proper (maximal) torque capability utilization of the machine.

Fault-tolerant behavior requirements of motors in steering systems are generally met by using dual electronic control units (ECU) or by the use of dual motors on a single shaft.

Figure 2:
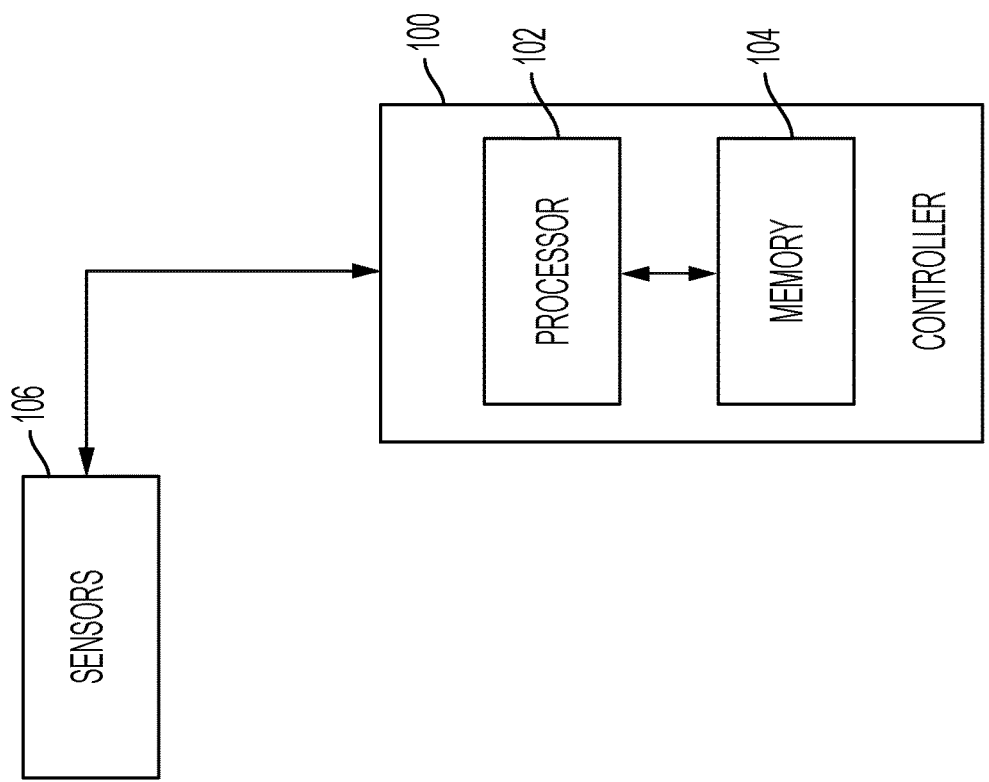
FIG. 2 generally illustrates a controller according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the controller 100 may be configured to select a number of windings for a motor of a handwheel actuator. The motor may include a 9/6 motor, a 12/8 motor, or other suitable motor. The motor may include a PMSM, such as an SPMSM or other suitable motor.

The controller 100 may short a subset of windings of the number of windings. The controller 100 may determine a resistance value for the motor. The controller 100 may selectively adjust the resistance value based on a number of windings associated with the subset of windows. The controller 100 may provide, in series with the subset of windings, at least one MOSFET configured to vary the resistance associated with the subset of windings based on a vehicle speed, and tune a damping characteristic associated with the handwheel actuator. The at least one MOSFET may include a depletion/enhanced mode MOSFET or other suitable MOSFET.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Fault tolerant behavior of motors in steering systems is tackled by dual wound machine configuration which could be of 9-slot, 6-pole or 12-slot, 8-pole combinations. The present disclosure describes a 12-slot, 8-pole machine, however the systems and methods of the present disclosure may be applicable to other motor configurations, such as a motor with any slot/pole combination. A dual wound PMSM mathematical model which includes interwinding coupling is represented by equation (1):

$$\begin{bmatrix} V_{d1} \\ V_{q1} \\ V_{d2} \\ V_{q2} \end{bmatrix} = \begin{bmatrix} R_1 + L_{d1}s & \omega_e L_{q1} & M_d s & \omega_e M_q \\ -\omega_e L_{d1} & R_1 + L_{q1}s & -\omega_e M_d & M_q s \\ M_d s & \omega_e M_q & R_2 + L_{d2}s & \omega_e L_{q2} \\ -\omega_e M_d & M_q s & -\omega_e L_{d2} & R_2 + L_{q2}s \end{bmatrix} \begin{bmatrix} I_{d1} \\ I_{q1} \\ I_{d2} \\ I_{q2} \end{bmatrix} + \omega_e \begin{bmatrix} 0 \\ \lambda_m \\ 0 \\ \lambda_m \end{bmatrix} \quad (1)$$

The steady state equations of the dual wound machine can be written as set forth in Equations (2)-(5), below:

$$V_{d1} = R_1 I_{d1} + \omega_e L_{q1} I_{q1} + \omega_e M_q I_{q2} \quad (2)$$

$$V_{q1} = -\omega_e L_{d1} I_{d1} + R_1 I_{q1} - \omega_e M_d I_{d2} + \omega_e \lambda_m \quad (3)$$

$$V_{d2} = \omega_e M_q I_{q1} + R_2 I_{d2} + \omega_e L_{q2} I_{q2} \quad (4)$$

$$V_{q2} = -\omega_e M_d I_{d1} - \omega_e L_{d2} I_{d2} + R_2 I_{q2} + \omega_e \lambda_m \quad (5)$$

where $V_{d1}, V_{q1}$ are the d-axis and q-axis voltages of the active windings, $V_{d2}, V_{q2}$ are the d-axis and q-axis voltages of the shorted windings. $I_{d1,q1}$ are the currents flowing in the active windings, $I_{d2}, I_{q2}$ are the currents flowing in the shorted windings. $R_{1,2}$ are the resistances of active winding and shorted winding respectively. $L_{d1,d2}$ are the d-axis inductances of active winding and shorted winding respectively. $L_{q1,q2}$ are the q-axis inductances of active winding and shorted winding respectively. $M_d$, $M_q$ are d-axis and q-axis mutual inductances respectively, $\omega_e$ is the electrical speed in rad/s, $\lambda_m$ is the permanent magnet (PM) flux linkage.

The PM flux linkage $\lambda_m$ is related to the number of poles $N_p$ of the machine through a constant value $K_e$, as set forth in equation (6), below:

$$\lambda_m = \frac{2}{N_p} K_e \quad (6)$$

The electromagnetic torque $T_e$ is determined by equations (7)-(9):

$$T_e = \frac{3}{2} p(\lambda_m + (L_{q1} - L_{d1})I_{d1})I_{q1} + \quad (7)$$

$$\frac{3}{2} p(\lambda_m + (L_{q2} - L_{d2})I_{d2})I_{q2} + \frac{3}{2} p(M_q - M_d)(I_{d1}I_{q2} + I_{d2}I_{q1})$$

$$T_e = T_{e1} + T_{e2} + T_{em} \quad (8)$$

$$T_{e1} = \frac{3}{2} p(\lambda_m + (L_{q1} - L_{d1})I_{d1})I_{q1}$$

$$T_{e2} = \frac{3}{2} p(\lambda_m + (L_{q2} - L_{d2})I_{d2})I_{q2}$$

$$T_{em} = \frac{3}{2} p(M_q - M_d)(I_{d1}I_{q2} + I_{d2}I_{q1})$$

$$p = \frac{N_p}{2} \quad (9)$$

Non-salient pole machines may be described by equations (10)-(13), below:

$$L_{q1} = L_{d1} = L_1 \quad (10)$$

$$L_{q2} = L_{d2} = L_2 \quad (11)$$

$$M_d = M_q = M \quad (12)$$

$$T_e = \frac{3}{2} \frac{N_p}{2} (\lambda_m (I_{q1} + I_{q2})) \quad (13)$$

A braking torque is generated by the dual wound PMSM due to the shorted winding set. The braking torque may be compensated to meet torque and speed requirements, the braking torque may compensated via control. Due to the difference in currents between the active winding set and shorted winding set, the mutual coupling plays a crucial role and need to be appropriately included and compensated in our current control. The detailed analysis, calculation of short circuit currents, compensation of braking torque and its estimation, incorporating the feedforward control with braking torque compensation terms and mutual coupling terms is described below.

For shorted winding set, $V_{d2}=V_{q2}=0$. Simplifying and solving the $V_{d2,q2}$ equations, the d-axis and q-axis short circuit currents are obtained by equations (14)-(15), below.

$$I_{d2} = \frac{-\omega_e M_q R_2 I_{q1} - \omega_e^2 L_{q2} M_d I_{d1} + \omega_e^2 L_{q2} \lambda_m}{R_2^2 + \omega_e^2 L_{d2} L_{q2}} \quad (14)$$

$$I_{q2} = \frac{\omega_e M_d R_2 I_{d1} - \omega_e \lambda_m R_2 - \omega_e^2 L_{d2} M_q I_{q1}}{R_2^2 + \omega_e^2 L_{d2} L_{q2}} \quad (15)$$

For non-salient pole machines, the d-axis and q-axis short circuit currents are obtained by equations (16)-(17), below.

$$I_{d2} = \frac{-\omega_e M R_2 I_{q1} - \omega_e^2 L_{q2} M I_{d1} + \omega_e^2 L_2 \lambda_m}{R_2^2 + \omega_e^2 L_2^2} \quad (16)$$

$$I_{q2} = \frac{\omega_e M R_2 I_{d1} - \omega_e \lambda_m R_2 - \omega_e^2 L_2 M I_{q1}}{R_2^2 + \omega_e^2 L_2^2} \quad (17)$$

The total electromagnetic torque $T_e$ is described by equation (18):

$$T_e = \frac{p \lambda_m}{R_2^2 + \omega_e^2 L_2^2} \left( \omega_e M R_2 I_{d1} + \left( R_2^2 + \omega_e^2 L_2 (L_2 - M) \right) I_{q1} - \omega_e \lambda_m R_2 \right) \quad (18)$$

Substituting equations (14) and (15) into equation (7) gives the torque expression in terms of currents of the active winding while inherently incorporating the effects of the braking torque generated by the shorted winding. Thus, the effective torque expression can be used to determine the correct current commands required for proper torque capability management of the machine.

Alternatively, for the case of non-salient machines, the calculations may be simplified by first determining the current commands for the active winding, then using (13), (22), and (23) to predict the braking torque generated by the second winding and compensating it with a single step delay in the subsequent control loop.

A braking torque estimator 318 is provided to account for the additional torque that is generated due to the presence of shorted winding set. A shorted winding parameter estimator 314 is provided to determine parameters of the shorted winding set.

Resistance of the shorted winding set is given by Equation (19):

$$\hat{R}_x = \frac{\hat{R}}{x} \quad (19)$$

where x is the number of parallel paths in the active winding. Inductance of the shorted winding set is given by Equation (20):

$$\hat{L}_{dqx} = \frac{\hat{L}_{dq}}{x} \quad (20)$$

Estimated braking torque is calculated based on the parameters including the interwinding coupling inductances of the shorted winding set and the short circuit currents $I_{d2}$, $I_{q2}$. The estimated braking torque is subtracted from the original torque command and new machine capability is determined and current commands are obtained based on new machine torque capability.

Figure 3:
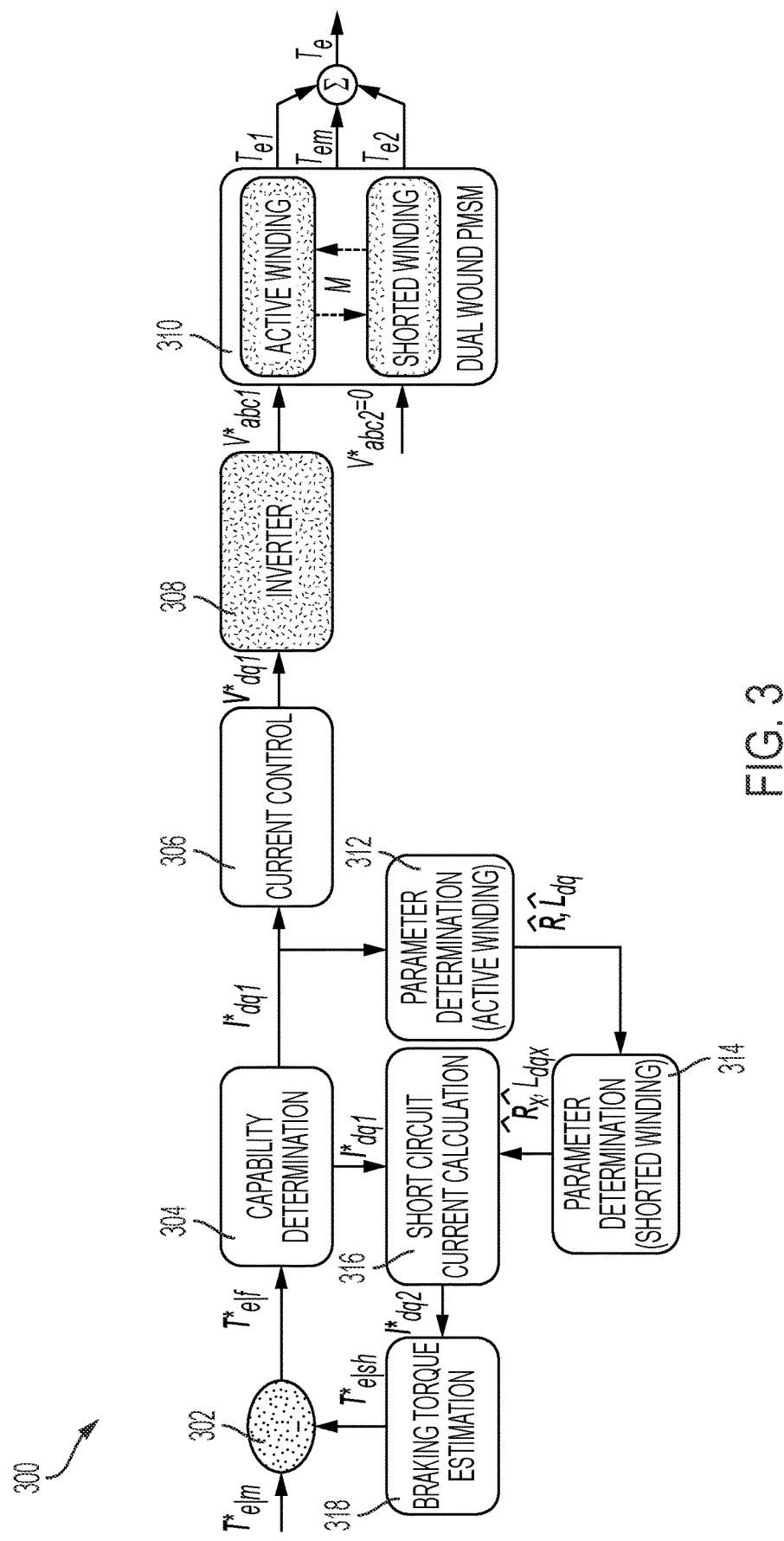
FIG. 3 shows a block diagram block diagram showing a system for controlling an actuator with passive damping, according to the principles of the present disclosure

FIG. 3 shows a block diagram block diagram showing a system 300 for controlling an actuator with passive damping, according to the principles of the present disclosure. The system 300 is configured to command an inverter 308 to apply an output voltage to an active set of windings of a motor 310 having two or more separate sets of windings, and thereby causing an output current to be generated in the active set of windings. The motor 310 may include, for example, a dual-would PMSM.

The system 300 includes a subtraction block 302 configured to subtract an estimated braking torque $T^*_{e|sh}$ from an initial torque command $T^*_{e|m}$ and to thereby calculate a final torque command $T^*_{e|f}$.

The system 300 also includes a motor capability estimator 304 configured to determine a command current for $I^*_{dg1}$ for the active set of windings of the motor 310 to cause the motor 310 to produce an output torque $T_e$ equal to the initial torque command $T^*_{e|m}$. The motor capability estimator 304 may use information regarding the motor 310, such as temperature, available dc voltage, motor operating speed and motor parameters, to calculate or to otherwise determine the command current $I^*_{dg1}$ for the active set of windings of the motor 310 to cause the motor 310 to produce the output torque $T_{em}$ equal to the initial torque command $T^*_{e|m}$. The command current $I^*_{dg1}$ may include d-axis and q-axis components. However, the command current $I^*_{dg1}$ may be arranged for a different reference frame, such as time domain, αβ domain, etc.

The system 300 also includes a current controller 306 configured to determine a voltage command $V^*_{dg1}$ for application to the active set of windings of the motor 310, and to cause the output current generated in the active set of windings to approximate the command current $I^*_{dg1}$.

The system 300 also includes the inverter 308 configured to apply an output voltage $V^*_{abc1}$ voltage to the active set of windings of the motor 310, and based on the voltage command $V^*_{dg1}$. The inverter 308 may include other components (not shown in the drawings), such as switching transistors, gate drivers, pulse-width modulator (PWM) controllers, transformation controllers to convert voltage command $V^*_{dg1}$ from the synchronous (i.e. dq) reference frame to the time domain.

The system 300 also includes an active winding parameter estimator 312 configured to determine estimated values of one or more parameters $\hat{R}$, $\hat{L}_{dg}$ of the active set of windings such as estimated resistance $\hat{R}$ and/or estimated inductance $\hat{L}_{dg}$. The active winding parameter estimator 312 may calculate or otherwise determine the estimated values of the parameters $\hat{R}$, $\hat{L}_{dg}$ of the active set of windings based on the command current $I^*_{dg1}$.

The system 300 also includes a shorted winding parameter estimator 314 configured to determine estimated values of one or more parameters $\hat{R}$, $\hat{L}_{dg}$ of the shorted set of windings such as estimated resistance $\hat{R}_x$ and/or estimated inductance $\hat{L}_{dgx}$. The shorted winding parameter estimator 314 may calculate or otherwise determine the estimated values of the parameters $\hat{R}_x$, $\hat{L}_{dgx}$ of the shorted set of windings based on the estimated values of the parameters $\hat{R}$, $\hat{L}_{dg}$ of the active set of windings The system 300 also includes a short circuit current estimator 316 configured to determine an estimated current $I^*_{dg2}$ in the shorted set of windings. The short circuit current estimator 316 may calculate or otherwise determine the estimated current $I^*_{dg2}$ in the shorted set of windings based on the command current $I^*_{dg1}$ for the active set of windings of the motor, and based on the estimated values of the parameters $\hat{R}_x$, $\hat{L}_{dgx}$ of the shorted set of windings.

Alternatively or additionally, the estimated current $I^*_{dg2}$ in the shorted set of windings may be determined using one or more offline methods from simulation analysis. The system and method may determine the estimated current $I^*_{dg2}$ in the shorted set of windings using an equation-based method or a look up table-based method. One example implementation using a one-step delay approach is provided in the present disclosure.

The system 300 also includes a braking torque estimator 318 configured to determine the estimated braking torque $T^*_{e|sh}$ resulting from shorting the shorted set of windings. The braking torque estimator 318 may calculate or otherwise determine the estimated braking torque $T^*_{e|sh}$ based on the estimated current $I^*_{dq2}$ in the shorted set of windings.

The steady state mathematical model of a single winding set of dual wound PMSM is shown by equation (29):

$$\begin{bmatrix} V_{d1} \\ V_{q1} \end{bmatrix} = \begin{bmatrix} R_1 & \omega_e L_{q1} \\ -\omega_e L_{d1} & R_1 \end{bmatrix} \begin{bmatrix} I_{d1} \\ I_{q1} \end{bmatrix} + \begin{bmatrix} 0 \\ \omega_e \lambda_m \end{bmatrix} \quad (29)$$

The effective model for active winding set incorporating the effects of the shorted winding set is determined based on the short circuit currents as shown by equation (30):

$$\begin{bmatrix} V_{d1} \\ V_{q1} \end{bmatrix} = \begin{bmatrix} R_1 + \frac{\omega_e^2 M_d M_q R_2}{\Delta} & \omega_e L_{q1} - \frac{\omega_e^3 M_d^2 L_{q2}}{\Delta} \\ -\omega_e L_{d1} + \frac{\omega_e^3 M_d^2 L_{q2}}{\Delta} & R_1 + \frac{\omega_e^2 M_d M_q R_2}{\Delta} \end{bmatrix} \begin{bmatrix} I_{d1} \\ I_{q1} \end{bmatrix} - \quad (30)$$

$$\frac{1}{\Delta}\begin{bmatrix} \omega_e^2 \lambda_m R_2 M_q \\ \omega_e^3 \lambda_m L_{q2} M_d \end{bmatrix} + \begin{bmatrix} 0 \\ \omega_e \lambda_m \end{bmatrix}$$

where $$\Delta = R_2^2 + \omega_e^2 L_{d2} L_{q2}.$$

For non-salient pole machines, the effective model for active winding set incorporating the effects of the shorted winding set is determined based on the short circuit currents as shown by equation (31):

$$\begin{bmatrix} V_{d1} \\ V_{q1} \end{bmatrix} = \begin{bmatrix} R_1 + \frac{\omega_e^2 M^2 R_2}{\Delta} & \omega_e L_{q1} - \frac{\omega_e^3 M^2 L_2}{\Delta} \\ -\omega_e L_{d1} + \frac{\omega_e^3 M^2 L_{q2}}{\Delta} & R_1 + \frac{\omega_e^2 M^2 R_2}{\Delta} \end{bmatrix} \begin{bmatrix} I_{d1} \\ I_{q1} \end{bmatrix} - \quad (31)$$

$$\frac{1}{\Delta}\begin{bmatrix} \omega_e^2 \lambda_m R_2 M \\ \omega_e^3 \lambda_m L_{q2} M \end{bmatrix} + \begin{bmatrix} 0 \\ \omega_e \lambda_m \end{bmatrix}$$

where $$\Delta = R_2^2 + \omega_e^2 L_2^2.$$

The feedforward voltage commands may be calculated based on the above equations to compensate the braking torque and mutual coupling effects.

Overall, the system and method of the present disclosure provide for enhanced feedforward control and braking torque compensation, especially where interwinding coupling is considered and significant for active control of shorted winding configured motors.

Figure 4:
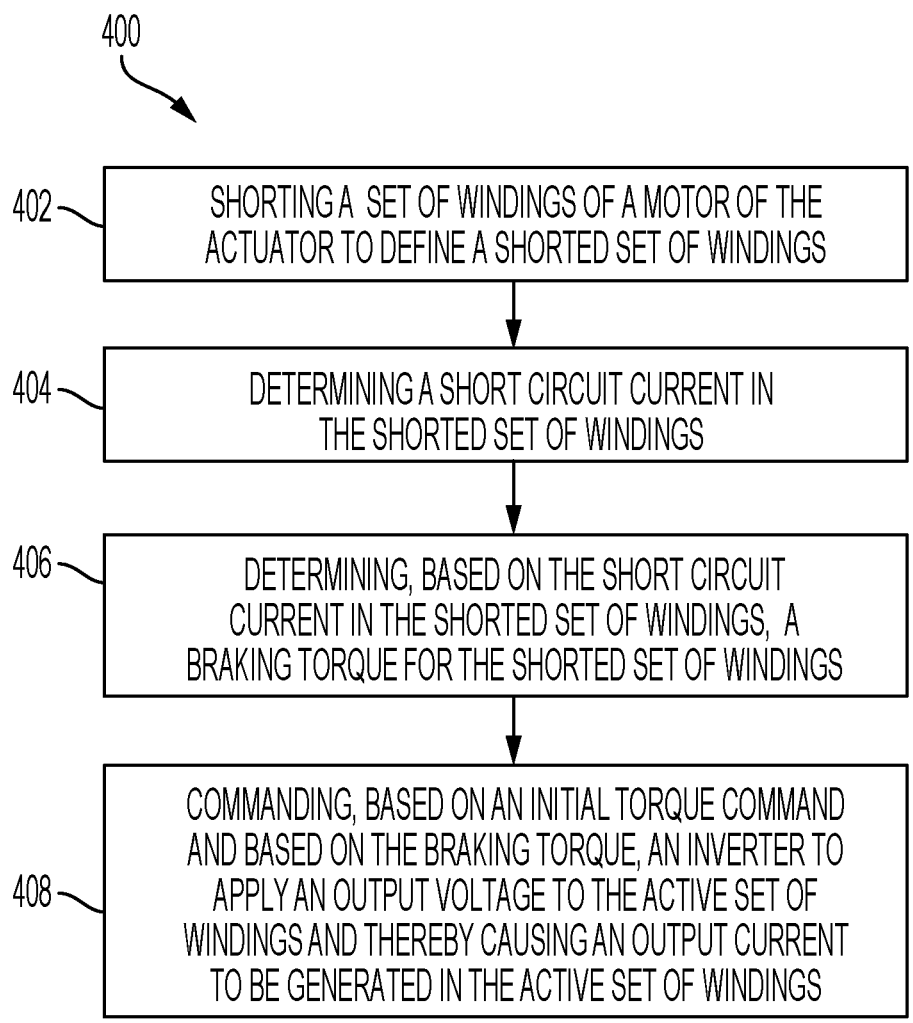
FIG. 4 is a flow diagram generally illustrating a method for controlling an actuator with passive damping, according to the principles of the present disclosure.

FIG. 4 is a flow diagram generally illustrating a method 400 for controlling an actuator with passive damping, according to the principles of the present disclosure. As can be appreciated in light of the disclosure, the order of operation within the method 400 is not limited to the sequential execution as illustrated in FIG. 4, but may be performed in one or more varying orders as applicable and in accordance with the present disclosure.

At 402, the method 400 shorts a set of windings of a motor of the actuator to define a shorted set of windings. For example, the processor 102 may include instructions to cause one or more switches to be in a conductive state and to short one or more sets of windings of the motor. Additionally or alternatively, one or more sets of windings of the motor may be permanently connected in a shorted state.

At 404, the method 400 determines a short circuit current in the shorted set of windings. For example, the processor 102 may include instructions to implement the short circuit current estimator 316 to determine the estimated current $I^*_{dg2}$ in the shorted set of windings.

At 406, the method 400 determines, based on the short circuit current in the shorted set of windings, a braking torque for the shorted set of windings. For example, the processor 102 may include instructions to implement the braking torque estimator 318 to determine the estimated braking torque $T^*_{e|sh}$ resulting from shorting the shorted set of windings.

At 408, the method 400 commands, based on an initial torque command and based on the braking torque, an inverter to apply an output voltage to the active set of windings and thereby causing an output current to be generated in the active set of windings. For example, the processor 102 may include instructions to implement the current controller 306 to determine the voltage command $V^*_{dg1}$, and to send the voltage command $V^*_{dg1}$ to the inverter 308 for causing the inverter 308 to apply an output voltage $V^*_{abc1}$ voltage to the active set of windings of the motor 310.

A method for controlling a motor drive with passive damping includes: shorting a set of windings of a motor to define a shorted set of windings; determining a short circuit current in the shorted set of windings; determining, based on the short circuit current in the shorted set of windings, a braking torque for the shorted set of windings; and commanding, based on an initial torque command and based on the braking torque, an inverter to apply an output voltage to an active set of windings of the motor and thereby causing an output current to be generated in the active set of windings.

In some embodiments, the method further includes: determining a final torque command based on an initial torque command and based on the braking torque; and determining a command current for the active set of windings of the motor based on the final torque command.

In some embodiments, the shorting the shorted set of windings further includes selectively conducting, by at least one metal-oxide semiconductor field-effect transistor (MOSFET) in series with at least one winding of the shorted set of windings, the current in the shorted set of windings.

In some embodiments, the method further includes: determining at least one parameter of the shorted set of windings, and in some embodiments determining the short circuit current in the shorted set of windings includes determining the short circuit current in the shorted set of windings based on the at least one parameter of the shorted set of windings.

In some embodiments, the at least one parameter of the shorted set of windings includes at least one of a resistance and an inductance of the shorted set of windings.

In some embodiments, the method further includes: determining at least one parameter of the active set of windings, and in some embodiments determining the at least one parameter of the shorted set of windings includes determining the at least one parameter of the shorted set of windings based on the at least one parameter of the active set of windings.

In some embodiments, the method further includes: determining at least one parameter of the active set of windings, and in some embodiments determining the command current for the active set of windings includes determining the command current for the active set of windings based on the at least one parameter of the active set of windings.

In some embodiments, the at least one parameter of the active set of windings includes at least one of a resistance and an inductance of the active set of windings.

In some embodiments, the method further includes: subtracting the braking torque from the initial torque command to determine a final torque command, and in some embodiments the commanding the inverter to apply the output voltage to the active set of windings includes commanding the inverter based on the final torque command.

In some embodiments, the method further includes: determining a current command based on the initial torque command and based on the braking torque; and determining a voltage command based on the current command, and in some embodiments the commanding the inverter to apply the output voltage to the active set of windings includes commanding the inverter based on the voltage command.

A system for controlling a motor drive with passive damping includes: a processor; and a memory including instructions. The instructions, when executed by the processor, cause the processor to: determine a short circuit current in a shorted set of windings of a motor; determine, based on the short circuit current in the shorted set of windings, a braking torque for the shorted set of windings; and command, based on an initial torque command and based on the braking torque, an inverter to apply an output voltage to an active set of windings of the motor and thereby cause an output current to be generated in the active set of windings.

In some embodiments, the instructions further cause the processor to: determine a final torque command based on an initial torque command and based on the braking torque. In some embodiments, determining the command current for the active set of windings of the motor further includes determining the command current for the active set of windings based on the final torque command.

In some embodiments, the system further includes at least one metal-oxide-semiconductor field-effect transistor (MOSFET) in series with at least one winding of the shorted set of windings and configured to selectively conduct the current in the shorted set of windings.

In some embodiments, the instructions further cause the processor to determine at least one parameter of the shorted set of windings, determining the short circuit current in the shorted set of windings includes determining the short circuit current in the shorted set of windings based on the at least one parameter of the shorted set of windings, and the at least one parameter of the shorted set of windings includes at least one of a resistance and an inductance of the shorted set of windings.

In some embodiments, the instructions further cause the processor to determine at least one parameter of the active set of windings, and determining the at least one parameter of the shorted set of windings includes determining the at least one parameter of the shorted set of windings based on the at least one parameter of the active set of windings.

In some embodiments, the instructions further cause the processor to determine at least one parameter of the active set of windings, determining the command current for the active set of windings includes determining the command current for the active set of windings based on the at least one parameter of the active set of windings, and the at least one parameter of the active set of windings includes at least one of a resistance and an inductance of the active set of windings.

In some embodiments, the instructions further cause the processor to subtract the braking torque from the initial torque command to determine a final torque command, and commanding the inverter to apply the output voltage to the active set of windings includes commanding the inverter based on the final torque command.

In some embodiments, the instructions further cause the processor to: determine a current command based on the initial torque command and based on the braking torque; and determine a voltage command based on the current command, and commanding the inverter to apply the output voltage to the active set of windings includes commanding the inverter based on the voltage command.

A system for controlling a motor drive for a steering system of a vehicle includes: a motor configured to apply a torque to actuate a component of the steering system; and a controller. The controller is configured to: determine a short circuit current in a shorted set of windings of the motor; determine, based on the short circuit current in the shorted set of windings, a braking torque for the shorted set of windings; and command, based on an initial torque command and based on the braking torque, an inverter to apply an output voltage to an active set of windings of the motor and thereby cause an output current to be generated in the active set of windings.

In some embodiments, the controller is further configured to determine a final torque command based on an initial torque command and based on the braking torque, and determining the command current for the active set of windings of the motor further includes determining the command current for the active set of windings based on the final torque command.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for controlling a motor drive with passive damping, the method comprising:
   shorting a set of windings of a motor to define a shorted set of windings;
   determining a short circuit current in the shorted set of windings;
   determining, based on the short circuit current in the shorted set of windings, a braking torque for the shorted set of windings; and
   commanding, based on an initial torque command and based on the braking torque, an inverter to apply an output voltage to an active set of windings of the motor and thereby causing an output current to be generated in the active set of windings.

2. The method of claim 1, further comprising:
determining a final torque command based on an initial torque command and based on the braking torque; and
determining a command current for the active set of windings of the motor based on the final torque command.

3. The method of claim 1, wherein shorting the set of windings further includes selectively conducting, by at least one metal-oxide-semiconductor field-effect transistor (MOSFET) in series with at least one winding of the shorted set of windings, the current in the shorted set of windings.

4. The method of claim 1, further comprising determining at least one parameter of the shorted set of windings, and
wherein determining the short circuit current in the shorted set of windings includes determining the short circuit current in the shorted set of windings based on the at least one parameter of the shorted set of windings.

5. The method of claim 4, wherein the at least one parameter of the shorted set of windings includes at least one of a resistance and an inductance of the shorted set of windings.

6. The method of claim 4, further comprising determining at least one parameter of the active set of windings, and
wherein determining the at least one parameter of the shorted set of windings includes determining the at least one parameter of the shorted set of windings based on the at least one parameter of the active set of windings.

7. The method of claim 1, further comprising determining at least one parameter of the active set of windings,
wherein determining the command current for the active set of windings includes determining the command current for the active set of windings based on the at least one parameter of the active set of windings.

8. The method of claim 7, wherein the at least one parameter of the active set of windings includes at least one of a resistance and an inductance of the active set of windings.

9. The method of claim 1, further including subtracting the braking torque from the initial torque command to determine a final torque command, and
wherein the commanding the inverter to apply the output voltage to the active set of windings includes commanding the inverter based on the final torque command.

10. The method of claim 1, further including:
determining a current command based on the initial torque command and based on the braking torque; and
determining a voltage command based on the current command, and
wherein the commanding the inverter to apply the output voltage to the active set of windings includes commanding the inverter based on the voltage command.

11. A system for controlling a motor drive with passive damping, the system comprising:
a processor; and
a memory including instructions that, when executed by the processor, cause the processor to:
determine a short circuit current in a shorted set of windings of a motor;
determine, based on the short circuit current in the shorted set of windings, a braking torque for the shorted set of windings; and
command, based on an initial torque command and based on the braking torque, an inverter to apply an output voltage to an active set of windings of the motor and thereby cause an output current to be generated in the active set of windings.

12. The system of claim 11, wherein the instructions further cause the processor to:
determine a final torque command based on an initial torque command and based on the braking torque; and
wherein determining the command current for the active set of windings of the motor further includes determining the command current for the active set of windings based on the final torque command.

13. The system of claim 11, further comprising at least one metal-oxide-semiconductor field-effect transistor (MOSFET) in series with at least one winding of the shorted set of windings and configured to selectively conduct the current in the shorted set of windings.

14. The system of claim 11, wherein the instructions further cause the processor to determine at least one parameter of the shorted set of windings,
wherein determining the short circuit current in the shorted set of windings includes determining the short circuit current in the shorted set of windings based on the at least one parameter of the shorted set of windings, and
wherein the at least one parameter of the shorted set of windings includes at least one of a resistance and an inductance of the shorted set of windings.

15. The system of claim 14, wherein the instructions further cause the processor to determine at least one parameter of the active set of windings, and
wherein determining the at least one parameter of the shorted set of windings includes determining the at least one parameter of the shorted set of windings based on the at least one parameter of the active set of windings.

16. The system of claim 11, wherein the instructions further cause the processor to determine at least one parameter of the active set of windings,
wherein determining the command current for the active set of windings includes determining the command current for the active set of windings based on the at least one parameter of the active set of windings, and
wherein the at least one parameter of the active set of windings includes at least one of a resistance and an inductance of the active set of windings.

17. The system of claim 11, wherein the instructions further cause the processor to subtract the braking torque from the initial torque command to determine a final torque command, and
wherein the commanding the inverter to apply the output voltage to the active set of windings includes commanding the inverter based on the final torque command.

18. The system of claim 11, wherein the instructions further cause the processor to:
determine a current command based on the initial torque command and based on the braking torque; and
determine a voltage command based on the current command, and
wherein the commanding the inverter to apply the output voltage to the active set of windings includes commanding the inverter based on the voltage command.

19. A system for controlling a motor drive for a steering system of a vehicle, the system comprising:

a motor configured to apply a torque to actuate a component of the steering system; and a controller configured to:
  determine a short circuit current in a shorted set of windings of the motor;
  determine, based on the short circuit current in the shorted set of windings, a braking torque for the shorted set of windings; and
  command, based on an initial torque command and based on the braking torque, an inverter to apply an output voltage to an active set of windings of the motor and thereby cause an output current to be generated in the active set of windings.

20. The system of claim 19, wherein the controller is further configured to determine a final torque command based on an initial torque command and based on the braking torque, and wherein determining the command current for the active set of windings of the motor further includes determining the command current for the active set of windings based on the final torque command.

\* \* \* \* \*